United States Patent [19]

Kuske et al.

[11] Patent Number: 5,269,841
[45] Date of Patent: Dec. 14, 1993

[54] TEMPERATURE-RESISTANT BLACK PIGMENT, A PROCESS FOR ITS PRODUCTION AND ITS USE

[75] Inventors: Peter Kuske; Gunter Buxbaum, both of Krefeld, Fed. Rep. of Germany

[73] Assignee: Bayer Aktiengesellschaft, Leverkusen, Fed. Rep. of Germany

[21] Appl. No.: 901,214

[22] Filed: Jun. 18, 1992

[30] Foreign Application Priority Data

Jul. 2, 1991 [DE] Fed. Rep. of Germany ...... 4121789

[51] Int. Cl.$^5$ .............................................. C09C 1/22
[52] U.S. Cl. .................................... 106/456; 106/459
[58] Field of Search ................................ 106/456, 459

[56] References Cited

U.S. PATENT DOCUMENTS

| | | | |
|---|---|---|---|
| 3,276,894 | 10/1966 | Hund et al. | 106/304 |
| 3,615,810 | 10/1971 | Holznagel et al. | 106/304 |
| 3,655,418 | 4/1972 | Hardy et al. | 106/304 |
| 3,822,210 | 7/1974 | Iwase et al. | 252/62.64 |
| 4,145,229 | 3/1979 | Ferrero et al. | 106/304 |
| 4,680,130 | 7/1987 | Hibst | 252/62.60 |

FOREIGN PATENT DOCUMENTS 626948 8/1992 Australia .
0176919 4/1986 European Pat. Off. .
0372335 6/1990 European Pat. Off. .
2159364 6/1973 Fed. Rep. of Germany .

OTHER PUBLICATIONS

Database WPIL, Derwent Publications Ltd., AN 92-214199 & JP-A-4 144 924 (Toda Kogyo Corp). Oct. 1990.
Database WPIL, Derwent Publications Ltd., AN 88-117465 & SU-A-1 337 392 (Sidorova). Mar. 1985.

Primary Examiner—Karl Group
Assistant Examiner—Chris Gallo
Attorney, Agent, or Firm—Connolly & Hutz

[57] ABSTRACT

A temperature-resistant black pigment which is a mixed oxide of manganese and iron with the structure of hematite and having a manganese content of 3 to 35% by weight, and with absolute color values in colorimetric testing in paint systems, expressed in CIELAB units, in the lightened form (Blend of 10 parts titaniumdioxide and 1 part of black pigment) of 60 to 70 for $L^*$, $-0.5$ to 1.9 for $a^*$ and $-4$ to $-6.5$ for $b^*$ useful for coloring autoclave-cured building materials and for pigmenting heat-resistant paint systems is obtained by preparing a precursor material of manganese and iron oxides or hydroxides, which contains the phase with the structure of spinel and calcining that precursor material in an oxidizing atmosphere at 500° to 1,000° C.

18 Claims, No Drawings

TEMPERATURE-RESISTANT BLACK PIGMENT, A PROCESS FOR ITS PRODUCTION AND ITS USE

This invention relates to a temperature-resistant black pigment consisting of a mixed oxide of manganese and iron with the crystal structure of hematite, to a process for the production of the pigment and to its use.

BACKGROUND OF THE INVENTION

Black pigments based on $Fe_3O_4$ have been successfully used for many applications. On account of their poor heat resistance, however, they are unsuitable for applications in autoclave-cured building materials or for temperature-resistant paints because they are oxidized to brown or red $Fe_2O_3$.

Commercially available black pigments of the $Fe_2O_3$—$Mn_2O_3$ system, as described in U.S. Pat. No. 3,615,810 are highly temperature-resistant and are eminently suitable for the applications mentioned above. However, pigments such as these have coloring strengths of only 40 to 70% compared with commercially available pigments based on $Fe_3O_4$ with the result that relatively large quantities of the pigments mentioned have to be added, for example to building materials, to obtain a deep black color impression.

U.S. Pat. 3,615,810 describes a process for the production of a temperature-resistant black pigment of the $Fe_2O_3$—$Mn_2O_3$ system consisting of phases with the structures of hematite and the principal constituent of bixbyite. In this process, oxidic or oxide-forming starting materials of iron and manganese are mixed, mineralizers, such as sodium chloride, are added to the resulting mixture and the whole is calcined at temperatures of 800° to 900° C. It is not possible by this process to obtain pigments of much higher coloring strength than the pigment Bayferrox ® 303T. The pigment Bayferrox ® 303T is a commercially available temperature-resistant black pigment of the $Fe_2O_3$—$Mn_2O_3$ system manufactured by Bayer AG.

DE-A 2 159 364 describes a process for the production of temperature-resistant black pigments with the structure of hematite. In this process, $\beta$-FeOOH is calcined with manganese-containing compounds. Due to the chloride structurally present in the $\beta$-FeOOH, considerable quantities of chlorine gas are released during calcination with manganese dioxide, which is a disadvantage for industrial-scale operation of the process. Although the pigments obtained by this process have very high coloring strength, they are undesirably tinged with a yellow-red color undertone. Accordingly, these pigments are unsuitable for obtaining a deep black color impression, for example for the production of slate-colored building materials or for deep black coil coating compositions.

According to U.S. Pat. No. 4,145,229, heat-stable black pigments are produced by calcination of mixtures consisting of iron sulfate and manganese-containing compounds. In view of the $SO_2$ formed during the process, the waste gases have to be subjected to expensive desulfurization. Black pigments are obtained for manganese contents of 11.5 to 46%, corresponding to an iron-to-manganese ratio of 5-0.5:1, and preferably 14 to 23%. Accordingly, the process follows the teaching of U.S. Pat. No. 3,615,810, according to which the phase having the structure of bixbyite bears the pigment properties. For manganese contents of less than 11.5%, corresponding to an iron-to-manganese ratio of >5:1, brown pigments are obtained.

According to U.S. Pat. No. 3,655,418, the hydroxides of iron and manganese are precipitated from solutions in the presence of flocculating agents and subsequently calcined. On account of their quality, the precipitates are difficult to filter and wash. The resulting salt contents in the filter cake give rise to extensive sintering during the calcination process, so that furnace clinkers that are difficult to grind up are obtained. The pigments lack coloring strength and are distinctly brownish. In addition, the decomposition of the salts during the calcination process means that the waste furnace gases have to be expensively purified.

According to U.S. Pat. No. 3,276,894, brown or black iron oxides of hematite structure are obtained by calcination of precursors produced by the aniline process. The black pigments obtained by this known process are distinguished by a distinct red tinge and by poor coloring strength. Their coloring strength by comparison with Bayferrox ® 303T is only 40 to 50%.

Accordingly, the problem addressed by the present invention was to provide a heat-stable black pigment of high coloring strength which would not have any of the described disadvantages.

BRIEF DESCRIPTION OF THE INVENTION

The present invention relates to a temperature-resistant black pigment which is a mixed oxide of manganese and iron with the structure of hematite and having a manganese content of 3 to 35% by weight and with absolute color values in colorimetric testing in paint systems, expressed in CIELAB units, in the lightened form (Blend of 10 parts titaniumdioxide and 1 part of black pigment) of 60 to 70 for $L^*$, $-0.5$ to 1.9 for $a^*$ and $-4$ to $-6.5$ for $b^*$. The present invention also relates to a process for preparing that black pigment which comprises preparing a precursor material of Mn and Fe oxides or hydroxides which contains the phase with the structure of spinel and then calcining that precursor material in an oxidizing atmosphere at 500° to 1,000° C.

DETAILED DESCRIPTION

It has now surprisingly been found that deep black pigments of the $Fe_2O_3$/$Mn_2O_3$ system can be obtained by calcination of precipitation products consisting of a phase having the structure of spinel of the $Fe_3O_4$/$Mn_3O_4$ mixed crystal series. Using the process according to the invention, black pigments are obtained for manganese contents of only 3% by weight wile deep black pigments are obtained for manganese contents of about 5 to 10% by weight.

The pigments of the $Fe_2O_3$/$Mn_2O_3$ mixed crystal series produced by the process according to the invention consist essentially of a phase having the structure of hematite and contain between 3 and 35% manganese. The hematite phase makes up at least 60% by weight and preferably more than 80% by weight of the pigment.

Accordingly, the present invention relates to a temperature-resistant black pigment consisting of a mixed oxide of manganese and iron with the structure of hematite, characterized in that it has a manganese content of 3 to 35% by weight and preferably 6 to 18% by weight and that, in colorimetric testing in paint systems, it shows absolute color values, expressed in CIELAB units, in the lightened form (Blend of 10 parts titaniumdioxide Bayertitan R-KB-2 and 1 part of black pigment)

of 60 to 70 for $L^*$, $-0.5$ to 1.9 and preferably 0 to 1.2 for $a^*$ and $-4$ to $-6.5$ and preferably $-5.0$ to $-6.0$ for $b^*$.

The present invention overcomes the prejudice emanating from U.S. Pat. No. 3,615,810, according to which that phase of black pigments of the $Fe_2O_3/Mn_2O_3$ system which has the structure of bixbyite bears the properties of the black pigment and the hematite phase is said to show an unwanted reddish color undertone and relatively poor coloring strength.

The black pigment according to the invention preferably has an $SiO_2$ content of $<1\%$ by weight and, more preferably, $<0.3\%$ by weight. Accordingly, it differs in this regard from pigments which have been obtained by calcination with mineral manganese dioxide.

The coloring strength of the black pigments according to the invention is determined in particular by their manganese content.

Pigments of particularly high coloring strength are obtained with an iron-to-manganese ratio of 10:1 to 4:1, corresponding to a manganese content of 6 to 14% by weight. In this range, the pigments develop greater coloring strength with increasing manganese content and show fewer red and yellow tinges. With an iron-to-manganese ratio of less than about 4:1, a phase having the structure of bixbyite is additionally observed in the calcined precursors. Accordingly, pigments with an iron-to-manganese ratio of less than 4:1 do not develop increasing coloring strength with increasing manganese content.

The coloristic values of the black pigments are also influenced by their content of additional elements. Particularly good coloristic values are shown by pigments according to the invention which contain one or more of elements aluminium, chrominium, titanium, magnesium, calcium and zinc in a total quantity of up to 5% by weight in the form of the oxides.

The present invention also relates to a process for the production of the black pigments according to the invention, characterized in that a precursor consisting of Mn and Fe oxides or hydroxides, which contains the phase with the structure of spinel, is initially prepared and is subsequently calcined in an oxidizing atmosphere at temperatures in the range from 500° to 1,000° C. and preferably at temperatures in the range from 600° to 800° C.

Precursors essentially consisting of a phase with the structure of spinel having the approximate composition $Fe_{3-x}Mn_xO_4$ with $0<x<3$ are particularly suitable.

The precursors are preferably prepared by a precipitation process in which salts of iron and manganese are oxidized in the presence of alkalis.

A process for their production is known, for example, from U.S. Pat. No. 3,822,210.

Precursors having specific surface area of 2 to 20 $m^2/g$ and, preferably, 4 to 10 $m^2/g$, as determined by the nitrogen adsorption method (DIN 66 131), are particularly suitable for the production of the pigments according to the invention. The calcination of relatively fine-particle precursors gives pigments which show an unwanted reddish or yellowish color undertone whereas the calcination of very coarse-particle precursors gives pigments of poor coloring strength. Accordingly, precursors having specific surfaces of 4 to 10 $m^2/g$ are particularly suitable because pigments of high coloring strength with no unwanted color undertone are obtained in their case.

The precipitated precursors are calcined at temperatures of 500° to 1,000° C. and preferably at temperatures of 600° to 800° C., typically over periods (residence times) of 15 to 180 minutes. Residence times of about 5 minutes at 800° C. are sufficient to obtain a complete reaction to a phase of hematite structure. The calcinations are preferably carried out at temperatures of 650° to 750° C. over residence times of 1 to 180 minutes and 30 to 120 minutes because, under these conditions, no distinct sintering occurs so that there is no need for laborious grinding. Moist filter cakes or dried precursor may be used for calcination. The salt content of the precursor is less than 1% and preferably less than 0.5%. with increasing salt content, distinct sintering is observed during calcination. In that case, pigments of high coloring strength can only be obtained after laborious grinding.

The calcinations are carried out with direct or indirect firing in an oxygen-containing atmosphere with typical oxygen contents of 10 to 20% by volume.

In a general embodiment of the process, salts of divalent iron and manganese in molar ratios of 20:1 to 2:1 are precipitated with alkaline preciptants, the quantity of precipitant used being at least twice the molar quantity of the metal salts used. The alkaline precipitation is accompanied by aeration in a stirred tank for 3 to 8 hours at temperatures of 60° C. to the boiling point. The suspension obtained is filtered on nutsches and washed to salt contents of less than 1% by weight. The washed filter cake is calcined in moist form or after drying.

The calcination is carried out in an oxidizing atmosphere at temperatures of 500° to 900° C. either in a muffle furnace or in a rotary kiln. The residence times may range from a few minutes to a few hours.

After grinding in the mills normally used for pigment production, for example in pinned disk mills, vibrating ball mills or jet mills, tests are carried out in the binder F 48 or L 64 in accordance with DIN 6174/ISO 7724, 1-3 drafts, for determining coloring strength and color tinge and the CIELAB (C/2 degree) values are shown in the Examples. The black pigment Bayferrox ® 303T (a product of Bayer AG) is used as reference.

The present invention also relates to the use of the black pigment according to the invention for coloring building materials and heat-resistant paint systems.

The following Examples are intended to illustrate the invention without limiting it in any way.

COMPARISON EXAMPLE 1

Example 4 of DE-A 02 159 364 was copied. According to diffractometric analysis, the washed, dried precursor consists essentially of $\beta$-FeOOH. In addition to a hematite phase, the calcined pigment contains other phases. The pigment was ground in a Dismembrator ® (3 mins., steel ball). The pigment has a coloring strength of 350% for $da^* =0.9$ and $db^*=4.7$. The pigment shows a distinct brown color undertone and is not suitable for deep black coloring.

COMPARISON EXAMPLE 2

Example 3 of DE-A 02 159 364 was copied. The pigment consists essentially of a phase with the structure of hematite and is brown-black in color. It has a coloring strength of 355% for $da^*=4.9$ and $db^*=12$.

COMPARISON EXAMPLE 3

Example 1 of U.S. Pat. No. 4,145,229 was copied. The pigment was calcined for 3 hours at 850° C. and ground in a Dismembrator ® (3 mins. , steel ball) . By comparison with Bayferrox ® 303T, the pigment has a coloring strength of 105% for da*=0.1 and db*=−0.1.

According to diffractometric analysis, the pigment contains phases having the structures of bixbyite and hematite.

COMPARISON EXAMPLE 4

Example 4 of U.S. Pat. No. 3,276,894 was copied. A pigment brown-black in color was obtained by calcination at temperatures of 600 ® to 800° C. This pigment is not suitable for deep black coloring. According to diffractometric analysis, the pigment contains phases with the structures of bixbyite and hematite.

EXAMPLE 1

In a 30 liter stirred tank equipped with an aerating stirrer, 10.1 l $FeSO_4$ solution containing 200 g $FeSO_4$l and 0.9 l $MnSO_4$ solution containing 600 g/l $MnSO_4.H_2O$ were combined and purged with nitrogen. 2.3 liters sodium hydroxide having a concentration of 656 g/l NaOH were then added over a period of 15 minutes, followed by heating with stirring to 85° C. 300 l/h air was then passed through 5.5 hours at 85° C. The black suspension was washed with about 20 l water on nutsches and dried at 80° C. in a recirculating air drying cabinet. According to analysis, the dried precursor contains 0.2% soluble salts. The specific surface of the precursor measures 5.3 m²/g. According to diffractometric analysis, the precursor consists of a phase with the structure of spinel.

300 g of the precursor were calcined for 4 hours at 700° C. in a rotary kiln while 500 l air/h was passed through. According to analysis, the pigment contains 12.5% Mn. An X-ray diffractogram of the pigment shows only the diffraction lines of hematite. The pigment was ground in different ways in a vibrating ball mill of the Dismembrator ® type:

a) 1 minute, agate ball
b) 3 minutes, steel ball
c) steam jet grinding.

Colorimetric testing in L 64, F 48 and in spar revealed coloring strengths of 200 to 260%. The pigment is deep black and does not show any unwanted color tinge.

| Grinding | Testing in | Coloring strength | da* | db* |
|---|---|---|---|---|
| 1 min. agate | L 64 | 201 | −0.2 | −0.3 |
| 3 mins. steel | L 64 | 260 | 0 | 0.1 |
| Steam jet | L 64 | 260 | 0.2 | 0.1 |
| Steam jet | F 48 | 252 | 0.4 | 0 |
| Steam jet | Spar | 214 | 0.2 | −0.9 |

EXAMPLE 2

The procedure was as in Example 1, except that 11.85 l $FeSO_4$ (200 g/l), 0.28 l $MnSO_4$ solution (600 g/l $MnSO_4.H_2O$) and 2.32 l sodium hydroxide (656 g/l) were used to prepare the precursor. The specific surface of the precursor measures 3.8 m²/g. Its salt content is 0.3% by weight. According to analysis, the precursor consists of a phase with the structure of spinel. The precursor was dried and calcined for 4 hours at 700° C. in a rotary kiln through which 500 l air/h was passed. After grinding in a Dismembrator ® (1 minute, agate ball), the pigment has a coloring strength of 164% for da*=1.4 and db*=0.4.

According to analysis, the pigment contains 3.9% by weight Mn and consists solely of a phase with the structure of hematite.

EXAMPLE 3

The procedure was as in Example 1, except that 11.39 l $FeSO_4$ (200 g/l) and 0.47 l $MnSO_4$ (600 g/l $MnSO_4.H_2O$) and 2.32 l NaOH (656 g/l) were used to produce the precursor. According to analysis, the precursor consists of a phase with the structure of spinel. The specific surface measures 3.6 m²/g.

The precursor was calcined for 4 hours at 700° C. and then ground in a steam jet mill with a ratio of steam-to-product of 3:1. According to colorimetric evaluation in L 64, the pigment has a coloring strength by comparison with 303T of 208% for da*=0.6 and db*=0.6. According to analysis, the pigment contains 6.4% Mn and consists of a phase with the structure of hematite.

EXAMPLE 4

The precursor was produced in the same way as described in Example 1, except that 10.1 l $FeSO_4$ (200 g/l) and 0.94 l $MnSO_4$ (600 g/l $MnSO_4$) and 2.32 l NaOH (656 g/l) were used.

The specific surface of the precursor measures 5.2 m²/g. According to analysis, the precursor consists of a phase with the structure of spinel.

The precursor was calcined for 4 hours at 550° C. and was ground for 1 minute with an agate ball in a Dismembrator ®. The pigment has a coloring strength in L 64 of 222% for da*=−0.1 and db*=0. It has a manganese content of 13.8%. According to phase analysis, the pigment consists of a phase with the structure of hematite.

EXAMPLE 5

The precursor of Example 4, accommodated in a preheated porcelain dish, was calcined for various tines at 700° C. in a muffle furnace and then ground in a Dismembrator ® (1 minute agate ball)

| Calcination time | Coloring strength | da* | db* |
|---|---|---|---|
| 10 mins. | 197 | −0.5 | 0.4 |
| 30 mins. | 192 | −0.6 | 0.5 |
| 60 mins. | 188 | −0.7 | 0.6 |
| 2 mins. | 225 | 0.9 | 1.3 |
| 4 mins. | 224 | 0 | 0.1 |

EXAMPLE 6

The procedure was as in Example 1, except that the addition of the sodium hydroxide was controlled in such a way that a constant pH value of 10.5 was maintained during the reaction. The precursor has a specific surface of 10 m²/g. The precursor was calcined for 2 hours at 700 ° C. and ground for 3 minutes with a steel ball in a Dismembrator ®. The pigment has a coloring strength in L 64 of 330% for da* =1.3 and db*=1.7.

TABLE 1

Absolute color values for Examples 1 to 6 and Comparison Examples 1 to 3. Lightening in L 64: Blend of 10 parts titaniumdioxide Bayertitan R-KB-2 and 1 part of black pigment.

| Example | L* | a* | b* | C* |
|---|---|---|---|---|
| 1a | 64.6 | 0.7 | −6.1 | 6.1 |
| 1b | 64.3 | 0.8 | −5.8 | 5.9 |

TABLE 1-continued

Absolute color values for Examples 1 to 6 and Comparison Examples 1 to 3. Lightening in L 64: Blend of 10 parts titaniumdioxide Bayertitan R-KB-2 and 1 part of black pigment.

|    | L*   | a*   | b*   | C*  |
|----|------|------|------|-----|
| 1c | 64.4 | 0.8  | −5.9 | 5.9 |
| 2  | 69.5 | 1.9  | −5.1 | 5.4 |
| 3  | 66.7 | 1.2  | −5.2 | 5.3 |
| 4  | 66.6 | 0.5  | −6.0 | 6.0 |
| 5a | 64.6 | 0.7  | −5.7 | 5.7 |
| b  | 65.1 | 0.5  | −5.8 | 5.8 |
| c  | 64.7 | 0.5  | −6.0 | 6.0 |
| d  | 66.1 | 1.5  | −4.5 | 4.7 |
| e  | 66.1 | 0.6  | −5.7 | 5.7 |
| 6  | 61.3 | 2.0  | −4.1 | 4.6 |
| 7  | 67.1 | −0.2 | −5.9 | 5.9 |
| Comparison Example |   |   |   |   |
| 1  | 61.5 | 1.6  | −1.6 | 2.3 |
| 2  | 61.4 | 5.6  | −5.8 | 8.1 |
| 3  | 73.3 | 0.5  | −5.0 | 5.0 |
| 303T | 73.9 | 0.4 | −5.0 | 5.0 |

EXAMPLE 7

The procedure was as in Example 1, except that 10.84 l FeSO$_4$ (200 g/l), 1.99 l MnSO$_4$ (600 g/l MnSO$_4$.H$_2$O) and 5.25 l NaOH (350 g/l) were used.

According to analysis, the precursor consists of a phase with the structure of spinel. The specific surface measures 6.4 m$^2$/g. The precursor was calcined for 4 hours at 750° C. and ground in a dismembrator ® (1 minute, agate ball). The pigment has a coloring strength of 208% for da* = −0.6, db*=0.1 and dc*=−0.1. The pigment contains 23% Mn.

According to phase analysis, the pigment contains phases with the structures of hematite and bixbyite. The hematite phase makes up approximately 85%.

What is claimed is:

1. A temperature-resistant black pigment which is a mixed oxide of manganese and iron with the structure of hematite and having a manganese content of 3 to 35% by weight, and with absolute color values in colorimetric testing in paint systems, expressed in CIELAB units, in the lightened form (Blend of 10 parts titaniumdioxide and 1 part of black pigment) of 60 to 70 for L*, −0.5 to 1.9 for a* and −4 to −6.5 for b*.

2. A temperature-resistant black pigment claimed in claim 1 wherein the manganese content is 6 to 18% by weight.

3. A temperature-resistant black pigment claimed in claim 1 wherein the color value for a* is 0 to 1.2.

4. A temperature-resistant black pigment claimed in claim 1 wherein the color value for b* is −5.0 to −6.0.

5. A temperature-resistant black pigment claimed in claim 1 which contains SiO$_2$ in an amount of less than 1% by weight.

6. A temperature-resistant black pigment claimed in claim 1 which further contains an oxide of one or more elements selected from the group consisting of aluminum, chromium, titanium, magnesium, calcium and zinc in a total quantity of up to 5% by weight.

7. A temperature-resistant black pigment claimed in claim 6 which contains SiO$_2$ in an amount of less than 0.3% by weight.

8. A process for the production of the black pigment claimed in claim 1 wherein a precursor material of Mn and Fe oxides or hydroxides, which contains the phase is with the structure of spinel, is initially prepared and is subsequently calcined in an oxidizing atmosphere at temperatures in the range from 500° to 1,000° C.

9. A process as claimed in claim 8 wherein the calcining temperature is in the range from 600° to 800° C.

10. A process as claimed in claim 8 wherein the precursor material is prepared by a precipitation process in which salts of iron and manganese are oxidized in the presence of alkalis.

11. A process as claimed in claim 8 wherein the precursor material has specific surfaces, as determined by the nitrogen adsorption method, of 2 to 20 m$^2$/g.

12. A process as claimed in claim 11 wherein the precursor material has specific surfaces of 4 to 10 m$^2$/g.

13. A process as claimed in claim 8 wherein before calcining, the precursor material is washed to salt content of less than 1% by weight and the precursor material is introduced into a calcining furnace in the form of a moist filter cake or in dried form.

14. A process as claimed in claim 13 wherein the precursor material is washed to a salt content of less than 0.5% by weight.

15. A process as claimed in claim 8 wherein the residence time in the calcining step is between 1 and 180 minutes.

16. A process as claimed in claim 15 wherein the residence time in the calcining step is 30 to 120 minutes.

17. In an improved autoclave-cured building materials containing a coloring agent, the improvement comprises said coloring agent being a black pigment according to claim 1.

18. In an improved heat-resistant paint system containing a coloring agent, the improvement comprises said coloring agent being a black pigment according to claim 1.

* * * * *